US012746889B2

(12) United States Patent
Avila et al.

(10) Patent No.: US 12,746,889 B2
(45) Date of Patent: Sep. 29, 2026

(54) CATALYTIC CONVERTER ALARM

(71) Applicant: INNOVATIVE AFTERMARKET GROUP, Phoenix, AZ (US)

(72) Inventors: Carl Anthony ("Tony") Avila, Phoenix, AZ (US); Andrew Ciccarelli, Tempe, AZ (US)

(73) Assignee: Innovative Aftermarket Group Inc., Chandler, AZ (US)

( * ) Notice: Subject to any disclaimer, the term of this patent is extended or adjusted under 35 U.S.C. 154(b) by 218 days.

(21) Appl. No.: 18/187,455

(22) Filed: Mar. 21, 2023

(65) Prior Publication Data

US 2023/0264654 A1 Aug. 24, 2023

Related U.S. Application Data

(63) Continuation-in-part of application No. 16/821,727, filed on Mar. 17, 2020, now Pat. No. 11,608,031, (Continued)

(51) Int. Cl.
*B60R 25/34* (2013.01)
*B60R 25/10* (2013.01)
(Continued)

(52) U.S. Cl.
CPC .......... *B60R 25/34* (2013.01); *B60R 25/1004* (2013.01); *B60R 25/102* (2013.01); *B60R 25/33* (2013.01); *B60R 25/403* (2013.01)

(58) Field of Classification Search
CPC ... B60R 25/34; B60R 25/1004; B60R 25/102; B60R 25/33; B60R 25/403
See application file for complete search history.

(56) References Cited

U.S. PATENT DOCUMENTS 4,690,240 A * 9/1987 Russo .................. B60R 25/043 180/287
5,481,253 A 1/1996 Phelan et al.
(Continued)

FOREIGN PATENT DOCUMENTS

CN 202966242 U * 6/2013
GB 2368440 A * 5/2002 ......... B60R 25/1003

OTHER PUBLICATIONS

English Translation CN 202966242 U (Year: 2025).*

*Primary Examiner* — Rami Khatib
(74) *Attorney, Agent, or Firm* — Venjuris, P.C.; Richard E. Oney

(57) ABSTRACT

A system for deterring and tracking the theft of a vehicle catalytic converter includes sensors, an accelerometer, and a processor. The sensors detect a vibration, a shock, an air pressure disturbance, or an audio frequency disturbance at the catalytic converter. The processor communicates wirelessly with a user mobile device and arms the system if the mobile device is not nearby. The processor determines from the accelerometer whether the vehicle is moving and whether there is a change in orientation of the catalytic converter. If the vehicle is not moving and a disturbance indicative of a theft is detected or there is a change in orientation of the catalytic converter, the processor activates an alarm, causes an onboard camera to capture an image and sends a notice to a server. To avoid false alarms, the processor disarms the system if the vehicle is moving or if the vehicle engine is running.

19 Claims, 6 Drawing Sheets

Related U.S. Application Data which is a continuation of application No. 15/549,986, filed as application No. PCT/US2016/019407 on Feb. 24, 2016, now Pat. No. 10,597,000, application No. 18/187,455, filed on Mar. 21, 2023 is a continuation-in-part of application No. 18/186,576, filed on Mar. 20, 2023.

(60) Provisional application No. 63/374,872, filed on Sep. 7, 2022, provisional application No. 62/134,349, filed on Mar. 17, 2015, provisional application No. 62/120,203, filed on Feb. 24, 2015, provisional application No. 63/269,677, filed on Mar. 21, 2022.

(51) Int. Cl.

| | |
|---|---|
| ***B60R 25/102*** | (2013.01) |
| ***B60R 25/33*** | (2013.01) |
| ***B60R 25/40*** | (2013.01) |

(56) References Cited

U.S. PATENT DOCUMENTS

| | | | | |
|---|---|---|---|---|
| 5,523,948 | A | 6/1996 | Adrain | |
| 5,719,551 | A | 2/1998 | Flick | |
| 6,011,460 | A | 1/2000 | Flick | |
| 6,535,116 | B1 * | 3/2003 | Zhou | B60C 23/0408 340/447 |
| 6,696,927 | B2 | 2/2004 | Flick | |
| 6,956,467 | B1 | 10/2005 | Mercado, Jr. | |
| 7,859,129 | B2 * | 12/2010 | Ozawa | B60R 25/1001 340/5.72 |
| 8,334,760 | B2 * | 12/2012 | Tanaka | B60H 1/00642 340/428 |
| 8,648,709 | B2 | 2/2014 | Gauger et al. | |
| 9,227,594 | B2 | 1/2016 | Reed et al. | |
| 2002/0003472 | A1 * | 1/2002 | Haruna | B60R 25/045 340/428 |
| 2004/0075541 | A1 | 4/2004 | Simoneau | |
| 2006/0087411 | A1 | 4/2006 | Chang | |
| 2007/0156311 | A1 | 7/2007 | Elcock et al. | |
| 2007/0236341 | A1 * | 10/2007 | Mackjust | G06F 1/1626 340/426.13 |
| 2009/0051510 | A1 | 2/2009 | Follmer et al. | |
| 2013/0249682 | A1 | 9/2013 | Van Wiemeersch et al. | |
| 2013/0295912 | A1 * | 11/2013 | Chen | H04W 4/44 455/420 |
| 2013/0297194 | A1 * | 11/2013 | Wisnia | B60R 25/209 701/113 |
| 2013/0335233 | A1 * | 12/2013 | Kamar | A61B 5/6898 701/32.4 |
| 2014/0104048 | A1 | 4/2014 | De Kock et al. | |
| 2014/0266654 | A1 * | 9/2014 | Parker | B60R 25/00 340/426.25 |
| 2015/0123777 | A1 * | 5/2015 | Potter | B60R 25/20 340/429 |
| 2017/0063996 | A1 * | 3/2017 | Kaster | H04L 63/1425 |
| 2021/0362685 | A1 * | 11/2021 | Moeller | B60R 11/04 |
| 2022/0169206 | A1 * | 6/2022 | Moeller | G06F 8/65 |
| 2022/0169207 | A1 * | 6/2022 | Moeller | B60R 25/245 |
| 2023/0158997 | A1 * | 5/2023 | White | G08B 3/00 340/430 |
| 2023/0206734 | A1 * | 6/2023 | Scott | G08B 13/1436 340/568.1 |
| 2023/0278526 | A1 * | 9/2023 | Broadnax | B60R 25/1001 340/426.1 |
| 2024/0391418 | A1 * | 11/2024 | Becht, III | B60R 25/10 |

* cited by examiner

Components of GPS Tracker with Catalytic Converter Alarm

CATALYTIC CONVERTER ALARM

RELATED APPLICATIONS

This patent application claims the benefit of U.S. Provisional Application No. 63/374,872, filed Sep. 7, 2022, entitled "CATALYTIC CONVERTER ALARM," which is incorporated in this application in its entirety by this reference as if fully set forth herein. This patent application is a Continuation-in-part Patent Application of and claims priority to U.S. patent application Ser. No. 18/186,576, entitled "Vehicle Rollover Notification System" and filed on Mar. 20, 2023, which claims the benefit of U.S. Provisional Application No. 63/269,677, filed Mar. 21, 2022, entitled "VEHICLE ROLLOVER NOTIFICATION SYSTEM," both of which are incorporated in this application in their entirety by this reference as if fully set forth herein. This patent application also is a Continuation-in-part Patent Application of and claims priority to U.S. patent application Ser. No. 16/821,727 filed on Mar. 17, 2020, titled "Glass Break Sensor System," which is a Continuation Patent Application of and claims priority to U.S. patent application Ser. No. 15/549,986 filed on Aug. 9, 2017, now U.S. Pat. No. 10,597,000, which claims the benefit of, and hereby incorporates by reference, the following: Patent Cooperation Treaty (PCT) patent application serial number PCT/US16/19407, filed on Feb. 24, 2016 and U.S. Provisional Application Nos. 62/120,203 and 62/134,349, filed Feb. 24, 2015 and Mar. 17, 2015, respectively, each entitled "OBD Glass Break Sensor System," all of which are incorporated herein in their entirety by this reference.

BACKGROUND

This invention relates to vehicle security systems. More particularly, it relates to a system and method for deterring and tracking the theft of a vehicle catalytic converter.

It is an object of the present invention to provide a system that can detect a catalytic converter theft event and in response, activate a security device such as an alarm and send a notification of and information about the theft event to the vehicle owner or a third party.

It is another object of the present invention to provide such a system that reduces the potential of false alarms of catalytic converter theft events.

Still another object of the invention is to provide such a catalytic converter alarm system that can be installed as a standalone system and that can also easily interface with a security system having additional security features, such as a GPS tracker that can provide location information about the theft event or an onboard camera that can capture images of the theft event.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided a catalytic system and method for deterring and tracking the theft of a vehicle catalytic converter.

In one preferred embodiment, the system includes one or more sensors, a wireless communication device, one or more accelerometers, and a processor. The sensors are configured to detect a disturbance including one or more of a vibration, a shock, an air pressure disturbance, or an audio frequency disturbance. The one or more accelerometers are configured to measure an acceleration of the vehicle and an orientation of the vehicle catalytic converter. The processor is programmed to communicate with the wireless communication device to determine whether the user mobile device is within a predefined proximity of the vehicle. If the user mobile device is within the predefined proximity of the vehicle, the processor can keep or place the catalytic converter alarm system in an unarmed state. If the user mobile device is not within the predefined proximity of the vehicle, the processor can keep or place the catalytic converter alarm system in an armed state. The processor is also programmed to communicate with the one or more accelerometers to determine whether the vehicle is moving and whether there is a change in orientation of the vehicle catalytic converter. The programming to determine whether the vehicle is moving can include programming to determine whether there is a linear acceleration of the vehicle catalytic converter.

The processor also is programmed to determine if the disturbance detected at the catalytic converter by the one or more sensors is indicative of an attempt to remove the catalytic converter. If it is determined that the vehicle is moving or that the vehicle engine is running, the processor is programmed to keep or place the catalytic converter in the unarmed state to avoid generating a trigger signal. In some embodiments, the processor is operative to determine whether the vehicle engine is running based, at least in part, on a comparison of a vibration signature of the detected disturbance to one or more vibration signatures recognized as a normal vehicle vibration. In some embodiments, the processor can be operative to determine whether the vehicle engine is running based on a vehicle battery voltage input from an OBD data link cable.

The processor also is programmed to generate a trigger signal if the catalytic converter alarm device is in the armed state, if it is not determined that the vehicle is moving, and if it is determined that: (i) the detected disturbance is indicative of an attempt to remove the vehicle catalytic converter; or (ii) there is a change in orientation of the vehicle catalytic converter. The processor is further programmed to cause a security device to be activated in response to the trigger signal.

In some embodiments of the invention, the security device can include an audible alarm. In some embodiments, the security device can include a camera onboard the vehicle and the processor can be further operative to: (i) communicate with the vehicle onboard camera; and (ii) in response to the trigger signal, cause the vehicle onboard camera to capture an image, which can be a still image or a video image.

The processor also is operative to cause a notice to be sent to the user mobile device in response to the trigger signal. In some embodiments, the processor can be operative to: (i) communicate with a GPS tracking device onboard the vehicle; and (ii) in response to the trigger signal, cause the GPS tracking device to send a notice to the user mobile device.

In some embodiments, the processor can be operative to keep or place the catalytic converter alarm system in the armed state or the disarmed state (i) by controlling a power relay to the one or more sensors configured to detect a disturbance at the vehicle catalytic converter, or (ii) by operating a wireless relay to enable and disable the security device.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

DETAILED DESCRIPTION

Figure 1:
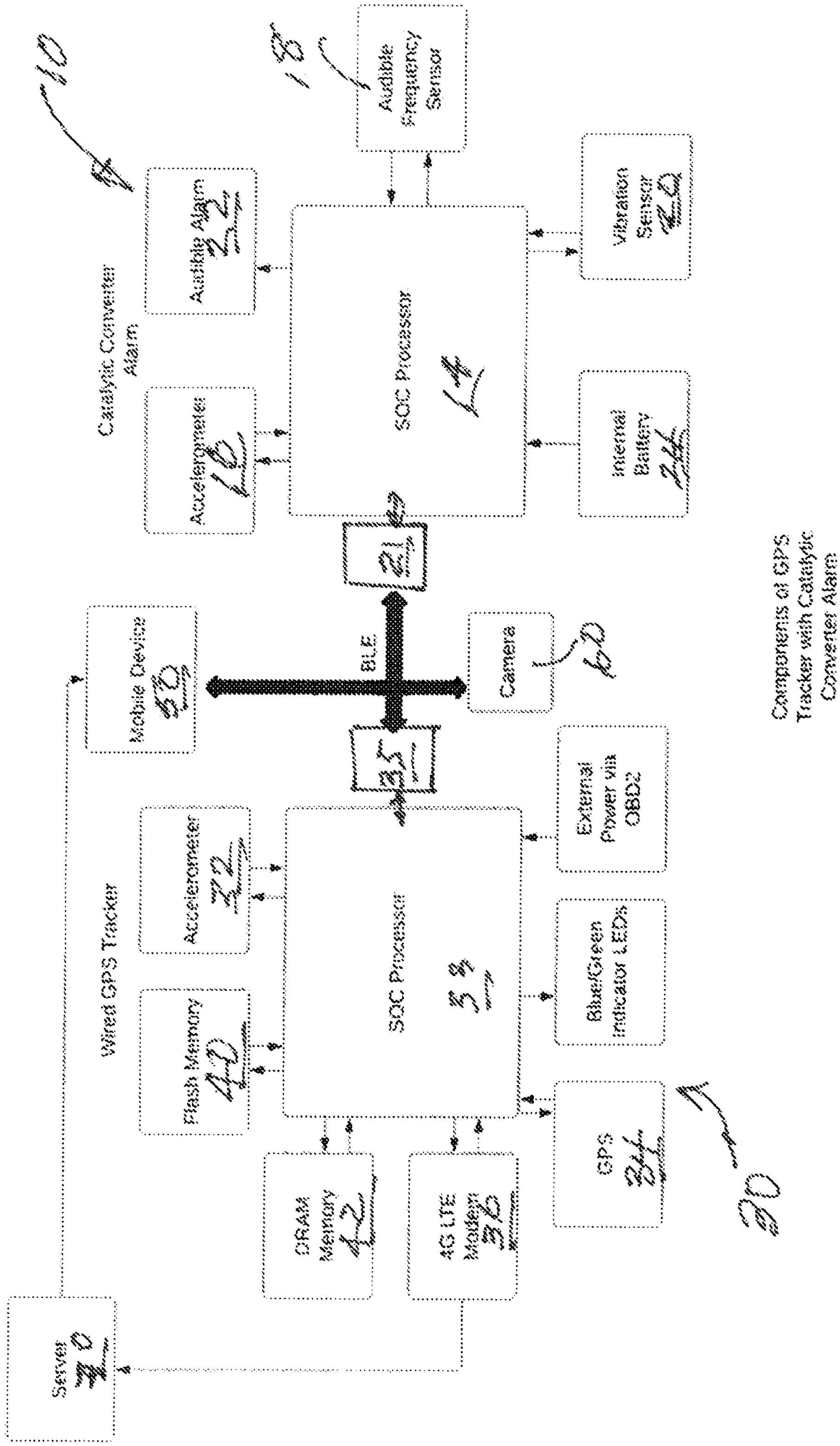
FIG. 1 is a block diagram of the components of one embodiment of a system for deterring and tracking theft of vehicle catalytic converters in accordance with the present invention.

Reference will now be made in more detail to presently preferred embodiments of the invention, as illustrated in the accompanying drawings. While the invention is described more fully with reference to these examples and drawings, the invention in its broader aspects is not limited to the specific details, representative devices, and illustrative examples shown and described. Rather, the description which follows is to be understood as a broad, teaching disclosure directed to persons of ordinary skill in the appropriate arts, and not as limiting upon the invention.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

Figure 2:
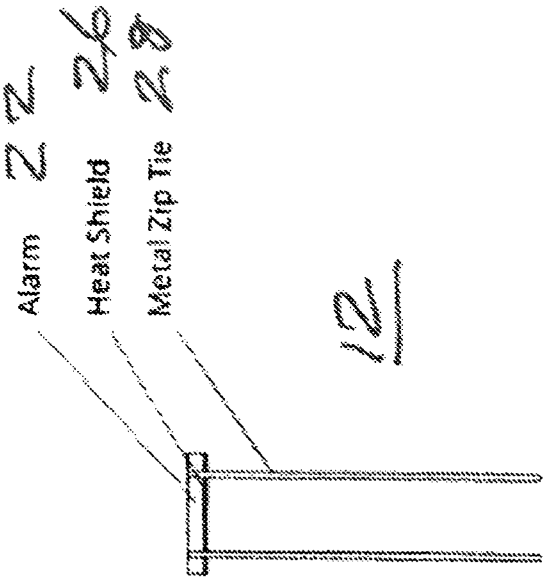
FIG. 2 is a side elevation view of a vehicle catalytic converter showing a catalytic converter alarm unit mounted to the catalytic converter according to one embodiment of the present invention.

Referring to FIGS. 1 and 2, one presently preferred embodiment of a system for deterring and tracking catalytic converter theft according to the present invention includes a modular catalytic converter alarm unit 10. The catalytic converter alarm unit 10 includes a catalytic converter alarm processor 14, a catalytic converter alarm accelerometer 16, an audio frequency sensor 18, a vibration sensor 20, a wireless communication device 21 (such as a Bluetooth low energy device, also known as BLE device), a high-decibel audible alarm siren 22 (such as a 115 dB siren), and internal batteries 24 (such as AA batteries), which can be rechargeable. The catalytic converter alarm processor 14 includes a CPU and suitable memory and is configured and programmed to receive input signals and data, to make the necessary calculations using that data, and to provide output signals, all to operate the catalytic converter alarm unit 10 as described in this specification. It will be understood by those of skill in the art that the catalytic converter alarm processor 14 can include one or more processor units or devices that together are suitable to perform the functions of the catalytic converter alarm unit 10. In some embodiments, the catalytic converter alarm unit 10 can communicate data wirelessly with an onboard tracker unit 30 (such as a GPS tracker unit) and a user's mobile device 50 via the wireless communication device 21. The catalytic converter alarm processor 14 and wireless communication device 21 (e.g., BLE device) can be part of a system-on-a-chip (SoC). Further details about examples of the components described above can be found in U.S. Pat. No. 10,597,000 B2, entitled "Glass Break Sensor System," which is incorporated herein in its entirety by this reference.

In some embodiments, the audio frequency sensor 18 can detect audio frequencies in a range from around 350 Hz to around 6.5 kHz and the vibration sensor 20 can detect vibration or air pressure disturbances in frequencies from about 5 kHz to about 50 kHz. The audio frequency sensor, vibration sensor 20, and catalytic converter alarm accelerometer 16 can be implemented using a digital accelerometer, such as the MMA8453Q digital accelerometer marketed by Freescale Semiconductor, Inc.

As shown in FIG. 2, the catalytic converter alarm unit 10 is mounted to a vehicle catalytic converter 12 and is protected from the heat of the catalytic converter 12 by a heat shield 26. In one exemplary embodiment, the catalytic converter alarm unit 10 is mounted to the catalytic converter 12 by metal zip ties 28 (such as 42-inch metal zip ties) and the heat shield 26 is made of an aerogel insulation material. Aerogels are a class of synthetic porous ultralight solid material derived from a gel, which material has an extremely low density and extremely low thermal conductivity. The aerogel material for the heat shield 26 can be selected to provide sufficient insulation to protect the catalytic converter alarm unit 10 from the heat generated by the catalytic converter 12. In some embodiments, the heat shield 10 can be a pad made of a composite material that includes aerogel and a fiberglass or ceramic material.

The catalytic converter alarm processor 14 can calculate movement of the catalytic converter 12 from the output measurements of the accelerometer 16 of the catalytic converter alarm unit 10. The catalytic converter alarm processor 14 can use such measurements to calculate the acceleration, speed and change in orientation (e.g., tilting) of the catalytic converter alarm unit 10. If a movement of the catalytic converter 12 is detected, the catalytic converter alarm processor 14 can use the accelerometer measurements to calculate orientation values for the catalytic converter 12. Further details about one example of an accelerometer used to calculate change in physical orientation of an object, such as tilting of the object, can be found in U.S. patent application Ser. No. 18/186,576 entitled "Vehicle Rollover Notification System" and filed on Mar. 20, 2023, which is incorporated herein in its entirety by this reference. If the physical orientation of the catalytic converter alarm unit 10 (which is mounted to the catalytic converter 12) changes (e.g., it tilts) by more than a preset threshold amount within a preset time period, it can indicate an attempted removal and theft of the catalytic converter 12. It can then send an appropriate notification of the theft attempt to the vehicle owner and/or a third party as described below.

In accordance with one advantageous aspect of the invention, the accelerometer 16 of the catalytic converter alarm unit 10 does not have to be installed in a specific, predefined orientation, and it does not have to be calibrated to such a predefined orientation to operate. The accelerometer 16 not only considers the acceleration values but also the rapid change in orientation values to recognize that the catalytic converter 12 is being tilted. Consequently, the accelerometer 16 does not require that it be calibrated to a standard stationary orientation to operate. This benefit, along with its modular design of the catalytic converter alarm unit 10, provides ease of installation.

Referring again to FIG. 1, one preferred embodiment of a system of the present invention can optionally operate with a tracker unit 30 in a GPS mode, as described in more detail below. Preferably, the tracker unit 30 is located in the cabin of the vehicle. The tracker unit 30 can be a modular unit equipped with a tracker unit processor 33, a tracker unit accelerometer 32, a GPS tracking component 34, a wireless communication device 35, and a cellular modem 36 that can communicate with a server 70 which can communicate with a user mobile device 50. The tracker unit processor 33 includes a CPU and suitable memory 40, 42 and is configured and programmed to receive input signals and data, to make the necessary calculations using that data, and to provide output signals, all to operate the tracker unit 30 as described in this specification. It will be understood by those of skill in the art that the tracker unit processor 33 can include one or multiple processors that together are suitable to perform the functions of the tracker unit 30. The tracker unit 30 is powered by a power source 38, which can be an internal power source such as an internal rechargeable battery. In some embodiments, power can be supplied to the tracker unit 30 by an external power source, such as via a vehicle OBD connector like that described in U.S. Pat. No. 10,597,000 B2, entitled "Glass Break Sensor System," which is incorporated herein in its entirety. The tracker unit 30 and catalytic converter alarm unit 10 can be operatively coupled to communicate with each other via the wireless communication devices 21, 35, which can be BLE devices.

The tracker unit 30 also can communicate with a camera 60 that is onboard the vehicle. In a presently preferred embodiment, the onboard camera 60 can be a Bluetooth-enabled camera, which can wirelessly communicate with the tracker unit processor 33 via the wireless device 35 or the catalytic converter alarm processor 14 via the wireless device 21. If the catalytic converter alarm unit 10 is in the armed state and a trigger signal is generated, the catalytic converter alarm unit 10 can communicate information about the triggering event via the wireless communication devices 21, 35 to the tracker unit 30, which can send a notification of the theft attempt with GPS location and time stamp to the owner/user's mobile device 50 via the cellular modem 36 and the server 70.

When the catalytic converter alarm unit 10 is in the armed state (as described below), the audio frequency sensor 18 of the catalytic converter alarm unit 10 can detect audio signals or disturbances that have "signatures" associated with an attempted theft of a catalytic converter. Also, in the armed state, the vibration sensor 20 can detect physical vibrations, shocks or other physical disturbances to the catalytic converter alarm unit 10 that have signatures indicative of an attempted theft. For example, such signatures can include a vibration signature associated with the use of a hacksaw, an audio vibration associated with a blow torch such signatures can include, or other vibration signatures not recognized as a normal vehicle vibration, such as an idling vibration. To achieve this, the catalytic converter alarm unit 10 is programmed to discern normal vehicle vibration (such as an engine idling vibration, which typically is in the range of 10-17 Hz) from theft vibrations. Once installed on a vehicle, the processor also can store vibration signatures that are detected during normal operation of the vehicle and can compare these normal vibration signatures with the signatures of later-detected disturbances. If one or more triggering audio or vibration signatures is detected (as determined by the processor 14) the catalytic converter alarm processor 14 can generate a trigger signal to cause the audible alarm 22 to be activated.

Also, when the catalytic converter alarm unit 10 is in the armed state, the catalytic converter alarm processor 14 can determine from the output of the accelerometer 16 whether the catalytic converter alarm unit 10 is being moved or tilted and thereby help determine whether the catalytic converter 12 is being removed. For example, if the orientation of the catalytic converter alarm unit 10 changes greater than a preset threshold amount within a preset time period (which indicates a tilting of the catalytic converter alarm unit 10), the catalytic converter alarm processor 14 can then generate a trigger signal to activate the audible alarm 22 or cause the onboard camera 60 to capture images and send them to the server 70 along with a report, which can then send an appropriate notification of the catalytic converter theft event to an end user.

After the catalytic converter alarm unit 10 is armed and begins listening for triggering events, it will be disarmed under certain conditions to avoid false trigger signals. For example, the system will be disarmed if the accelerometer detects that the vehicle is moving or if the vibration sensor detects a vibration indicating that the vehicle is running.

Standalone Mode

Figure 3:
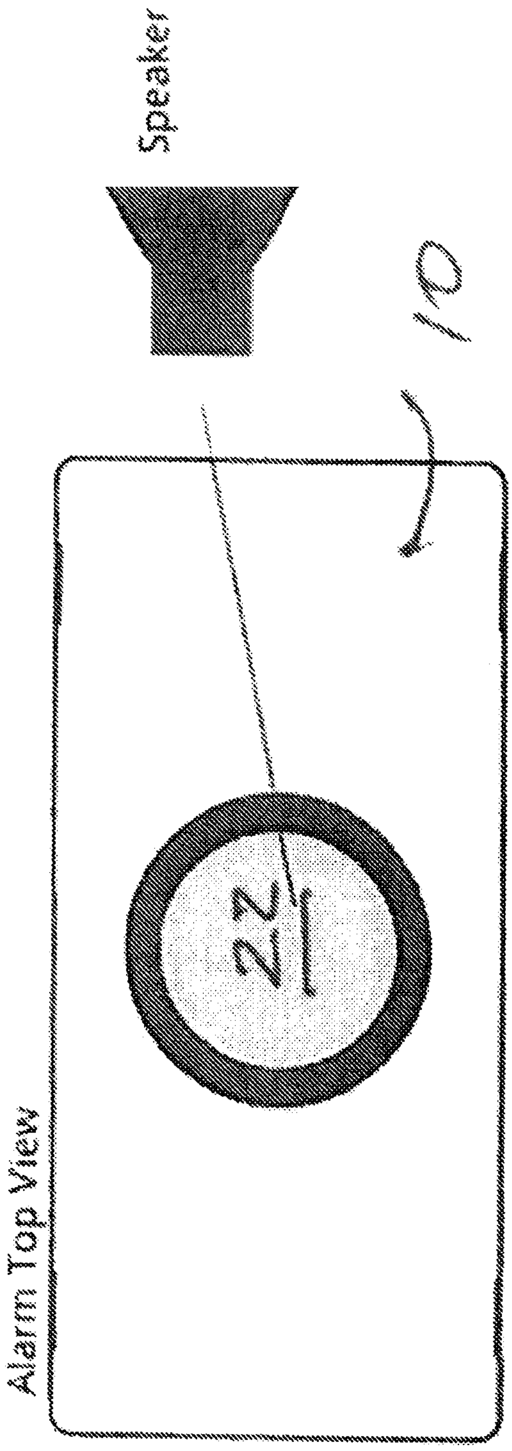
FIG. 3 is a top plan view of the catalytic converter alarm unit shown in FIG. 2.
Figure 4:
FIG. 4 is a side elevation view of the catalytic converter alarm unit shown in FIG. 2.
Figure 5:
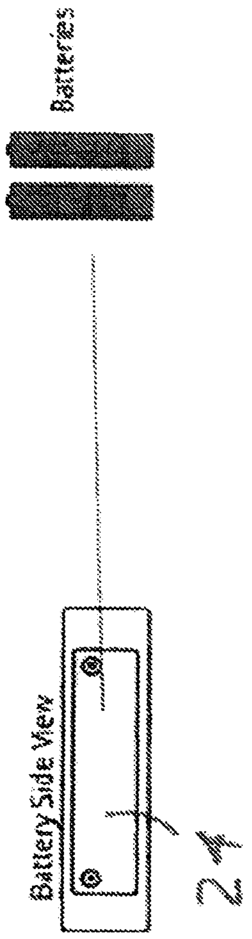
FIG. 5 is an end elevation view of the catalytic converter alarm unit of in FIG. 2, showing a door of a compartment for receiving batteries for the catalytic converter alarm unit.
Figure 6:
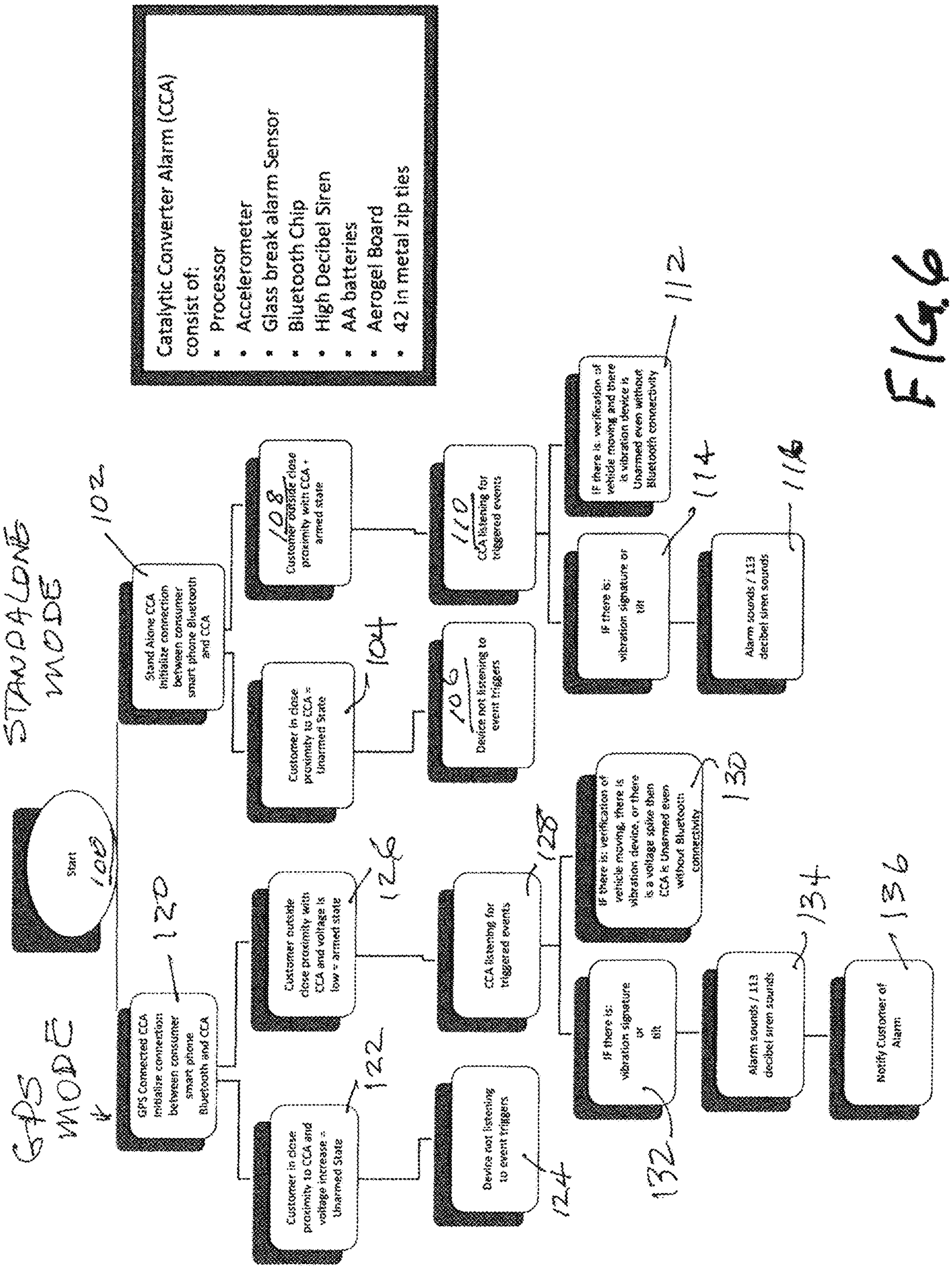
FIG. 6 is a flow chart illustrating the operation of the vehicle catalytic converter alarm system of FIG. 1.

Referring to FIG. 3, in a standalone mode, the catalytic converter alarm unit 10 establishes a wireless connection with the user's mobile device 50 via the wireless communication device 21 (step 102), then begins the process of placing the catalytic converter alarm unit 10 in the "Armed" state or the "Unarmed" state. When the catalytic converter alarm unit 10 and the user's mobile device 50 are connected, the wireless communications device 21 can be used to estimate the proximity of the user to the catalytic converter alarm unit 10. If the wireless communication device 21 is a BLE device, one way that the catalytic converter alarm unit 10 can do so is by obtaining a measurement of the Received Signal Strength Indication (RSSI) for the user's mobile device 50, which can then be used to calculate an estimated distance between the catalytic converter alarm unit 10 and the user's mobile device 50. The processor 14 can then use this distance to determine whether to arm or disarm the catalytic converter alarm unit 10. For example, when the mobile device 50 of the vehicle owner/user is in the vehicle or otherwise determined to be within a predefined close proximity to the vehicle, the catalytic converter alarm unit 10 can be placed in the "Unarmed" state (step 104) so that the catalytic converter alarm unit 10 does not "listen for" triggering events or generate trigger signals (step 106). If the vehicle owner/user walks away from the vehicle carrying the mobile device 50, the catalytic converter alarm unit 10 can switch to "Arm" mode (step 108) to listen for triggering events and generate trigger signals (step 110). In some embodiments, the processor 14 can switch the catalytic converter alarm unit 10 between the armed state and disarmed state by controlling a power relay (not shown) to the supply power for the audio frequency sensor 18 and the vibration sensor 20, and in some embodiments, the catalytic converter alarm unit 10 can be switched between the armed state and the disarmed state by operating a wireless relay (such as Bluetooth relay) to enable and disable the audible alarm 22 or other device that provides an alarm or otherwise notifies the user about a triggering event, or that collects information about a triggering event (such as an on-board camera).

When the catalytic converter alarm unit 10 is armed (steps 108 and 110) and the outputs of the accelerometer 16 and/or the vibration sensor 20 indicate that the vehicle/catalytic converter alarm unit 10 is moving, the processor can then disarm the catalytic converter alarm unit 10 (step 112) to avoid false triggering signals from the audio frequency sensor 18, vibration sensor 20 and accelerometer 16. If the catalytic converter alarm unit 10 remains armed and a triggering event is detected (step 114), the catalytic converter alarm processor 14 will generate a trigger signal and the audible alarm 22 will sound (step 116). Also, the wireless communication device 21 can send a notice of the triggering event to the user's mobile device 50 via the tracker processor 33 and cellular modem 36.

After the catalytic converter alarm unit 10 is unarmed, it can be automatically armed under certain conditions, such as (i) when the catalytic converter alarm accelerometer 16 senses that the vehicle has been moving and comes to a stop for a predetermined period of time, or (ii) the wireless communication device 21 (e.g., the BLE device) fails to connect with the user's mobile device 50 or determines that the user's mobile device is outside of the predetermined close proximity distance. With this process, the catalytic converter alarm unit 10 can operate whether or not the driver of the vehicle has a mobile device 50 that can connect with the wireless communication device 21.

GPS Mode

Referring to FIG. 3, when the catalytic converter alarm unit 10 is operating with the tracker unit 30 (also connected via Bluetooth), the catalytic converter alarm unit 10 will communicate with the tracker unit 30 (which can be located in the vehicle cabin) to arm and disarm the catalytic converter alarm unit 10 based on whether the vehicle is starting, stopping, idling, moving or parked. The catalytic converter alarm unit 10 can use its processor 14 and/or the tracker unit processor 33 to run this process, and the tracker unit processor 33 can calculate the movement of the vehicle from the output measurements of the a tracker unit accelerometer 32.

Still referring to FIG. 3, in the GPS mode, the catalytic converter alarm unit 10 establishes a wireless connection with the tracker unit 30 and the user's mobile device 50 via the wireless communication device 21 (step 120), then begins the process of placing the catalytic converter alarm unit 10 in the "Armed" state or the "Unarmed" state. If the vehicle owner/user is in the vehicle or in close proximity of the vehicle, and the vehicle is running, the catalytic converter alarm unit 10 will be placed in the "Unarmed" state (step 122). In that state, the catalytic converter alarm unit 10 does not "listen for" triggering events (step 124). In this embodiment, the system can determine the engine condition by monitoring the vehicle electrical bus voltage (at the OBD connector port) for signature conditions indicating whether the engine is off or on, as described in more detail in U.S. Pat. No. 10,597,000 B2, entitled "Glass Break Sensor System," which is incorporated herein in its entirety. If the vehicle owner/user walks away from the vehicle and the vehicle is off (i.e., the vehicle is parked), the catalytic converter alarm unit 10 will switch to "Arm" mode (step 126) to listen for triggering events (step 128) in the manner described above. When the catalytic converter alarm unit 10 is armed (steps 126 and 128) and the outputs of the accelerometer 16, the vibration sensor 20, and the electrical bus voltage indicate that the vehicle/catalytic converter alarm unit 10 is running, the processor 14 will then disarm the catalytic converter alarm unit 10 (step 130) to avoid false triggering signals.

Still referring to FIG. 3, if the catalytic converter alarm unit 10 remains armed and a triggering event is detected (step 132), the catalytic converter alarm processor 14 will generate a trigger signal and the audible alarm 22 will sound (step 134). Also, the catalytic converter alarm unit 10 can communicate information about the triggering event via the wireless communication devices 21, 35 to the tracker unit 30, which can send a notification of the theft attempt with GPS location and time stamp to the owner/user's mobile device 50 via the cellular modem 36. Additionally, if the vehicle is equipped with an onboard camera 60, such as a Bluetooth camera, the system can cause the camera to attempt to capture images of the triggering event, which images can be sent to the vehicle owner or a third party via the cellular modem 36. The images can be, by way of example, a still image or a video.

Upon reading this disclosure, additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

What is claimed is:

1. A catalytic converter alarm system for a vehicle, the system comprising:

one or more sensors configured to detect (i) a movement disturbance at a vehicle catalytic converter, wherein the movement disturbance includes one or more of a vibration, a shock, and an air pressure disturbance, and (ii) an audio frequency disturbance;

a wireless communication device configured to communicate with a user mobile device;

one or more accelerometers configured to measure an acceleration of the vehicle and an orientation of the vehicle catalytic converter;

a processor operative to:

after the one or more sensors are installed on a vehicle, store one or more normal vibration signatures that are detected during normal operation of the vehicle, communicate with the wireless communication device and determine whether the user mobile device is within a predefined proximity of the vehicle;

if the user mobile device is within the predefined proximity of the vehicle, keep or place the catalytic converter alarm system in an unarmed state;

if the user mobile device is not within the predefined proximity of the vehicle, keep or place the catalytic converter alarm system in an armed state;

communicate with the one or more accelerometers and determine whether the vehicle is moving and whether there is a change in orientation of the vehicle catalytic converter;

if a movement disturbance is detected at the catalytic converter by the one or more sensors, determine if the detected movement disturbance is indicative of an attempt to remove the catalytic converter including being operative to compare a movement signature of the detected disturbance to the one or more normal vibration signatures;

if an audio frequency disturbance is detected by the one or more sensors, determine if the detected audio frequency disturbance is indicative of an attempt to remove the catalytic converter;

keep or place the catalytic converter in the unarmed state to avoid generating a trigger signal if it is determined that the vehicle is moving or that the vehicle engine is running;

generate a trigger signal if the catalytic converter alarm device is in the armed state and if:

it is not determined that the vehicle is moving; and it is determined that (i) the detected movement disturbance or the detected audio frequency disturbance is indicative of an attempt to remove the vehicle catalytic converter, or (ii) there is a change in orientation of the vehicle catalytic converter; and cause a security device to be activated in response to the trigger signal.

2. The catalytic converter alarm system of claim 1 wherein the security device is an audible alarm.

3. The catalytic converter alarm system of claim 1 wherein the processor is further operative to cause a notice to be sent to the user mobile device in response to the trigger signal.

4. The catalytic converter alarm system of claim 1 wherein the processor is further operative to:

communicate with a tracking device onboard the vehicle; and in response to the trigger signal, cause the tracking device to send a notice to the user mobile device.

5. The catalytic converter alarm system of claim 4 wherein the security device comprises a vehicle onboard camera and the processor is further operative to:

communicate with the vehicle onboard camera; and in response to the trigger signal, cause the vehicle onboard camera to capture an image.

6. The catalytic converter alarm system of claim 1 wherein the processor is further operative to determine whether the vehicle engine is running based on a vehicle battery voltage input from an OBD data link cable.

7. The catalytic converter alarm system of claim 1 wherein the processor is operatively coupled to the one or more accelerometers to determine whether there is a linear acceleration of the vehicle catalytic converter, and the processor is operative to determine that the vehicle is moving based at least in part on whether there is a linear acceleration of the vehicle catalytic converter.

8. The catalytic converter alarm system of claim 1 wherein the processor is operatively coupled to the one or more accelerometers to detect the change in orientation of the catalytic converter.

9. The catalytic converter alarm system of claim 1 wherein the processor is operative to keep or place the catalytic converter alarm system in the armed state either (i) by controlling a power relay to the one or more sensors configured to detect a disturbance at the vehicle catalytic converter, or (ii) by operating a wireless relay to enable and disable the security device.

10. The catalytic converter alarm system of claim 1 wherein the processor is operative to determine whether the vehicle engine is running based, at least in part, on a comparison of a vibration signature of the detected movement disturbance to the one or more normal signatures.

11. A method for deterring and tracking the theft of a vehicle catalytic converter, the method comprising:

establishing a wireless connection between a catalytic converter alarm device mounted to a vehicle and a user mobile device;

using the wireless connection to determine whether the user mobile device is within a predefined proximity of the vehicle;

if the user mobile device is within the predefined proximity of the vehicle, keeping or placing the catalytic converter alarm device in an unarmed state;

if the user mobile device is not within the predefined proximity of the vehicle, keeping or placing the catalytic converter alarm device in an armed state;

automatically detecting whether there is a disturbance at the vehicle catalytic converter, including one or more of a vibration, a shock, an air pressure disturbance, or an audio frequency disturbance;

automatically determining whether the vehicle is moving;

automatically determining whether there is a change in orientation of the vehicle catalytic converter;

if a disturbance at the catalytic converter is detected, automatically determining if the detected disturbance is indicative of an attempt to remove the catalytic converter, including comparing a vibration signature of the detected disturbance to one or more normal vehicle vibration signatures that were detected by the catalytic converter alarm device after it was mounted to the vehicle and during normal operation of the vehicle;

if the catalytic converter alarm device is in the armed state, generating a trigger signal if:

it is not determined that the vehicle is moving; and it is determined that (i) the detected disturbance is indicative of an attempt to remove the vehicle catalytic converter, or (ii) there is a change in orientation of the vehicle catalytic converter;

if the catalytic converter alarm device is in the armed state, placing the catalytic converter into the unarmed state to avoid generating a trigger signal if:

it is determined that the vehicle is moving or that the vehicle engine is running; and if the catalytic converter alarm device is armed, causing a security device to be activated in response to the trigger signal.

12. The method of claim 11 wherein the step of determining whether the vehicle is moving comprises detecting whether there is a linear acceleration of the vehicle catalytic converter and determining that the vehicle is moving based at least in part on whether there is a linear acceleration of the vehicle catalytic converter.

13. The method of claim 11 wherein the step of determining whether there is a change in orientation of the vehicle catalytic converter comprises using an accelerometer to detect a change in orientation of the catalytic converter.

14. The method of claim 11 wherein the step of automatically placing the catalytic converter alarm device into the disarmed state or the step of automatically placing the catalytic converter into the unarmed state comprises (i) operating a wireless relay to enable and disable the security device, or (ii) controlling a power relay to one or more sensors configured to automatically detect whether there is a disturbance at the vehicle catalytic converter.

15. The method of claim 11 wherein the step of determining whether the vehicle engine is running comprises comparing a vibration signature of a detected disturbance to one or more vibration signatures recognized as a normal vehicle vibration.

16. The method of claim 11 wherein the step of determining whether the vehicle engine is running comprises monitoring a vehicle electrical bus voltage for a signature condition indicating whether the engine is on.

17. The method of claim 11 wherein the step of determining whether the vehicle is moving comprises using an accelerometer to detect movement of the vehicle.

18. The method of claim 11 wherein the step of causing a security device to be activated in response to the trigger signal comprises causing a camera onboard the vehicle to capture an image.

19. The method of claim 11 further comprising:

establishing a wireless connection between the catalytic converter alarm device and a tracker unit; and if the catalytic converter alarm device is in the armed state, causing the tracker unit to send a notice to the user mobile device in response to the trigger signal.

* * * * *